Sept. 29, 1953     J. N. STRAUSS     2,653,683
TELESCOPIC SHOCK ABSORBER
Filed Sept. 27, 1947     2 Sheets-Sheet 1
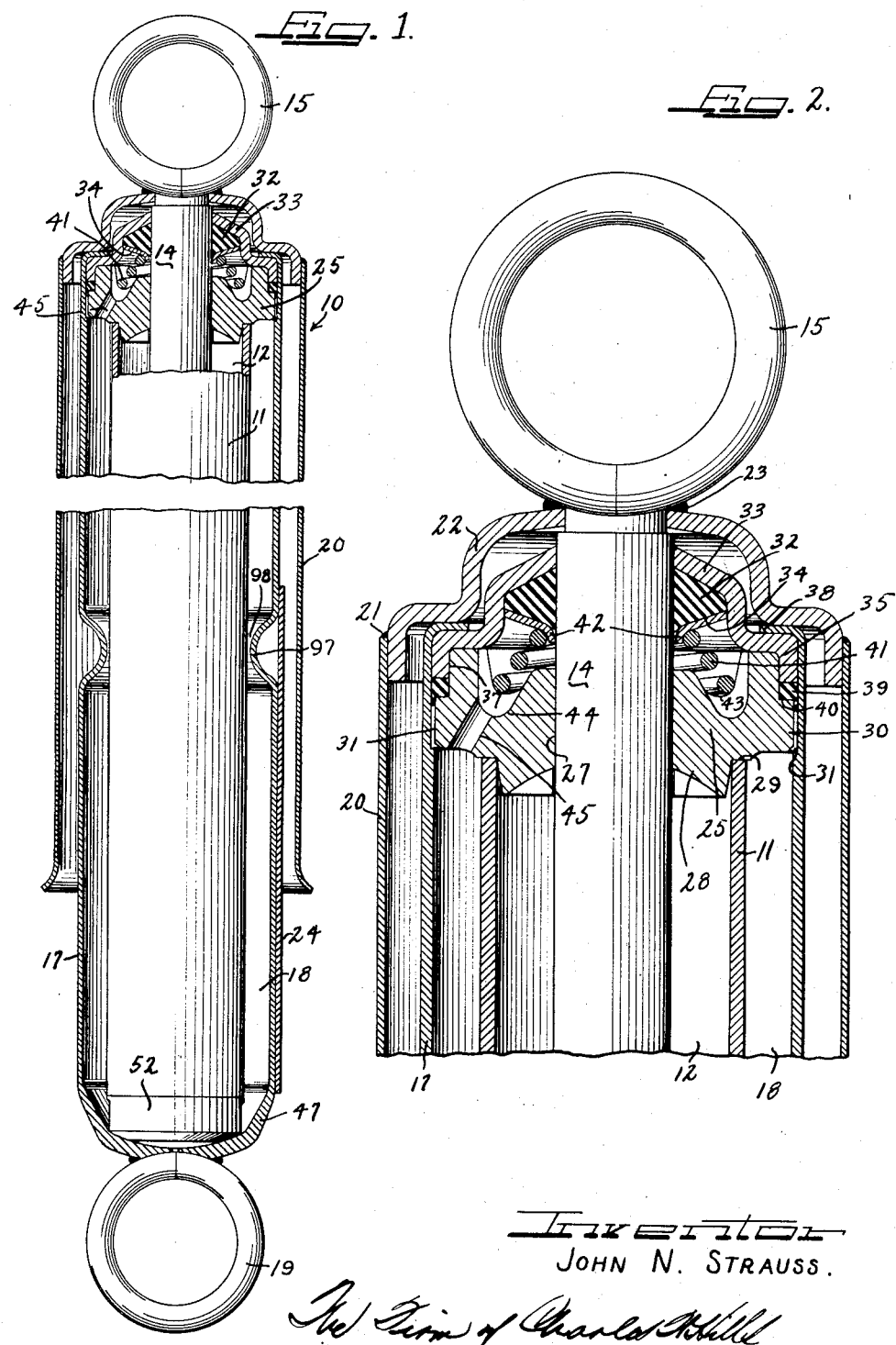
Inventor
JOHN N. STRAUSS.

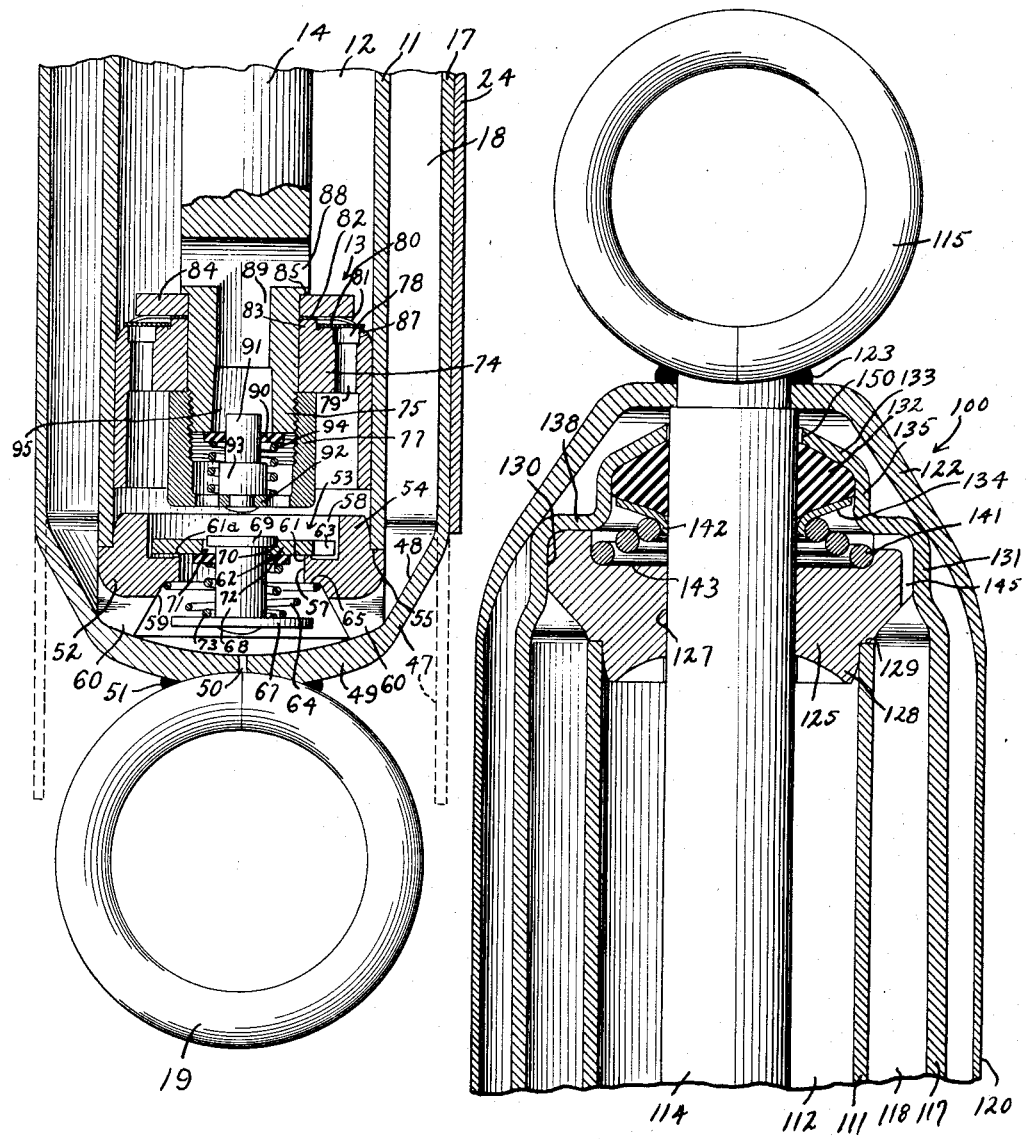

Patented Sept. 29, 1953

2,653,683

UNITED STATES PATENT OFFICE 2,653,683

TELESCOPIC SHOCK ABSORBER

John Noble Strauss, Detroit, Mich., assignor to Houdaille-Hershey Corporation, Detroit, Mich., a corporation of Michigan Application September 27, 1947, Serial No. 776,437

11 Claims. (Cl. 188—88)

This invention relates to improvements in telescopic or direct acting shock absorbers of the type which are adapted to be employed between the sprung and unsprung portions of an automotive vehicle.

An important object of the present invention is to improve and simplify the structure of telescopic or direct acting shock absorbers.

Another object of the invention is to provide an improved casing structure for direct acting or telescoping shock absorbers.

A further object of the invention is to provide in a direct acting shock absorber an outer casing having an improved one-piece bottom structure.

Still another object of the invention is to provide an improved top closure structure for a direct acting shock absorber.

Another object of the invention is to provide in a direct acting shock absorber an improved outer casing having a one-piece top structure.

A still further object of the invention is to provide in a direct acting shock absorber means for eliminating the usual separately formed splash guard within the reservoir chamber.

An additional object of the invention is to improve the valve structures for direct acting shock absorbers.

It is also an object of the invention to provide an improved method for making a direct acting shock absorber having a casing with an integral end closure cap in one piece therewith.

Other objects, features and advantages of the invention will be readily apparent from the following detailed description of certain preferred embodiments thereof taken in conjunction with the accompanying two sheets of drawings, in which:

Figure 1 is a fragmental vertical sectional view through a direct acting hydraulic shock absorber embodying features of the invention;

Figure 2 is an enlarged vertical sectional view through the upper part of the shock absorber shown in Figure 1;

Figure 3 is an enlarged vertical sectional view through the lower part of the shock absorber shown in Figure 1; and Figure 4 is a vertical sectional view through the upper part of a direct acting hydraulic shock absorber showing certain modifications.

A telescopic or direct acting shock absorber 10 (Figures 1 to 3) embodying features of the invention comprises a cylinder tube 11 defining a hydraulic fluid chamber 12 within which a valved piston 13 is slidably reciprocable and has a piston rod 14 which extends beyond one end of the cylinder 11 and carries at its outer end an attachment eye 15 by which the shock absorber is adapted to be secured to the sprung portion of a vehicle or the like. An outer tubular casing 17 of larger diameter concentrically surrounds the cylinder 11 and provides a reservoir chamber 18 thereabout. For attaching the shock absorber to the unsprung portion of the vehicle, the casing 17 carries at its lower end an attachment eye 19. A shield tube 20 of larger diameter than the casing tube 17 is secured as by means of welding 21 to the perimeter of an end cap 22 secured, together with the upper attachment ring 15, as by means of welding 23, to the upper end of the piston rod 14. A stone shield plate or guard 24 may, where necessary or desirable, be secured in any suitable manner to the lower exterior portion of the casing tube 17 in that portion subject to exposure in the rebound movement of the shield tube 20.

The upper end of the piston chamber 12 and of the reservoir chamber 18 is closed by means which, in the present instance, comprises a closure plug 25 which serves also as a guide for the piston rod 14 and as a retainer and concentricity prop. To this end, the plug member 25 is formed with a central bore 27 through which the piston rod 14 extends slidably. Concentric with the bore 27 is a downwardly extending tapered centering boss 28 which is adapted to fit snugly within the upper end of the cylinder tube 11, a shoulder 29 opposing the end of the tube. A lateral circular flange 30 overlies the reservoir 18 and is preferably in peripherally slightly spaced relation to the reservoir casing tube 17 whereby an annular space 31 is afforded.

Since a certain amount of hydraulic fluid may be forced from the chamber 12 through the bore 27, or at least be carried through the bore on the piston rod 14, a packing gland arrangement is provided for retaining any such escaping fluid within the shock absorber. In the present instance the gland structure comprises packing material 32 surrounding the piston rod 14 and maintained under compression thereagainst between an end cap 33 and a pressure plate 34. The end cap 33 is provided with a marginal angular flange 35 which seats upon the top of the closure and centering plug member 25 and has the cylindrical extremity portion thereof extending down into a rabbet groove 37 at the upper corner of the plug member, being there maintained in assembly by a turned-over marginal flange 38 at the upper extremity of the casing tube 17. The flange 35 cooperates as a centering medium by fitting concentrically snugly between the opposing engaged portions of the plug member 25 and the casing tube 17.

In order to maintain a leak-proof joint between the flange 35, the closure plug member 25 and the adjacent wall of the casing tube 17, packing material 39 is pressed within an annular extension groove portion 40 at the bottom of the rabbet 37. This packing may be a ring of rubber or analogous material characterized by resilience and pliability but little compressibility, the space 31 affording a relief or spill groove into which excess packing ring material may squeeze as best seen in Figure 2.

The pressure plate 34 is forced against the packing 32 by a spiral compression coil spring 41 having its smaller end engaging within the reentrant groove juncture afforded by a downturned inner marginal flange 42 on the pressure plate, while the larger end of the spring seats within an upwardly opening annular groove 43 in the top of the closure member 25. Sump depressions 44 in the groove 43 communicate by way of one or more ducts 45 in the closure plug member 25 with the upper end of the reservoir 18 for returning fluid retained by the packing 32 to the reservoir for reuse.

At its lower end the casing tube 17 is, according to the present invention, formed with an integral, cupped closure cap portion 47. This is formed by contracting and shaping the end portion of the tubing from which the casing 17 is made. For this purpose the end portion of the tubing, indicated in dash outline in Figure 3, may be worked by a cold working process or by a process utilizing heat such as induction heating. Suitable tooling forms the end portion radially inwardly to provide a generally frusto-conical tapered section 48 adjacent the principal diameter of the tube and a thickened, concave extremity wall 49. Should the contracted edge of the tube extremity not come completely together at the axis of the casing so that a small opening 50 remains, such opening will be completely sealed in hydraulically leak-proof condition by the connector ring 19 secured to the outside of the extremity wall portion 49 as by welding 51. It will be apparent that this construction provides an inexpensive, exceptionally strong bottom wall or closure for the shock absorber.

The lower end of the cylinder tube 11 is maintained concentric with the casing tube 17 and is closed off from the reservoir 18 by a closure member 52 which also provides a cage for a foot valve assembly 53. To this end the member 52 is formed with an upstanding annular flange 54 arranged to fit snugly within the lower end of the tube 11, a radial flange 55 about the base at the outer side of the flange 54 affording a seat for the lower end of the cylinder tube 11. The exterior diameter of the member 52 may be approximately the same as the external diameter of the cylinder tube 11, and this diameter may coincide substantially with the juncture between the frusto-conical portion 48 and the extremity wall portion 49 of the one-piece bottom closure 47. Thereby, with the bottom of the member 52 resting upon the extremity wall 49, the lower outside corner thereof is held by the lower extremity of the frusto-conical portion 48 concentric with the bottom closure 47.

For flow of hydraulic fluid between the piston chamber 12 and the reservoir 18 under the control of the foot valve assembly 53, the end closure and cage member 52 is formed with a central bore 57 which communicates at its upper end with a counterbore 58 and at its lower end with a counterbore 59, the latter defining, with the bottom wall 49, a chamber having communication with the reservoir 18 through lateral passages 60 formed in the lower rim of the member 52. Defining the upper opening of the axial bore 57 is a valve seat rim 61 upon which seats a disk check valve 62 having a series of lateral spacer arms 63 and adapted to check flow of hydraulic fluid through the bore 57 during the compression stroke of the piston 13 but to permit relatively free return flow of hydraulic fluid during rebound stroke of the piston 13. The rim 61 may have one or more limited by-pass grooves 61a.

Means for holding the check valve disk 62 against leaving its cage, but permitting relatively free rebound opening of the check valve, comprise a spiral spring 64 of relatively soft character having its large end engaging a seat 65 provided about the lower end of the bore 57 and its smaller end resting against an abutment disk 67 carried by the lower end of a stem 68 of substantially smaller diameter than the bore 57 and depending from the valve disk 62. At its upper end the stem 68 extends through the valve disk 62 and has a lateral flange or head 69 seating in centered relation within an upwardly opening recess 70 in the top of the valve disk.

For controlled flow of hydraulic fluid from the piston chamber 12 during the compression stroke of the piston 13, a compression fluid flow port or series of ports 71 of limited flow area is provided about the head end of the stem 68 and controlled by a disk valve 72 slidably disposed about the stem 68 and held seated by a coiled compression spring 73 bearing at its upper end against the valve disk 72 and at its lower end against the abutment disk 67. The compression spring 73 is loaded to hold the check valve disk 72 closed until a predetermined pressure has been developed in the chamber 12 during the compression stroke of the piston 13.

The piston 13 comprises a skirted piston body 74 which is secured onto a reduced diameter threaded end portion 75 on the piston rod 14 by means of a sleeve nut 77 of substantially smaller outer diameter than the inner diameter of the piston skirt. At its upper end, the piston body 74 is formed with an upwardly opening annular concentric channel 78 with which a series of vertical passages 79 communicate through the valve body with the lower side of the valve body interiorly of the skirt thereof. A thin ring disk check valve 80 overlies the channel 78 and thereby prevents rebound pressure fluid from passing into the channel 78 and through the passages 79 from the upper to the lower side of the piston in the rebound stroke thereof. On compression stroke, however, the check valve 80 is permitted to lift from its seat in opposition to relatively light pressure exerted by retaining fingers 81 of a spring ring disk 82 seated upon an upwardly projecting annular spacer shoulder 83 formed on the valve body and by which the valve disk is clamped against a retainer flange ring 84 seated against a keeper shoulder 85 formed on the piston rod 14.

For passage of a small metered quantity of liquid to opposite sides of the piston during normal slight fluctuations of the piston in operation of the associated vehicle, the seat for the check valve 80 about the outer margin defining the channel 78 may be formed with one or a series of small radial by-pass notches 87.

For rebound blow-off, the upper or high pressure side of the piston chamber 12 communicates through a cross bore 88 and an axial connecting bore 89 in the piston rod 14 with the low pressure side of the piston under the control of a rebound blow-off check valve 90. To guide the check valve 90 an upwardly projecting valve guiding stem 91 is carried by a spider 92 formed integrally with the lower end of the nut 77. At its upper end, the stem 90 extends to a minimum extent into the lower end of the bore 89.

The blow-off check valve 90 is in the form of centrally apertured disk seating against the end of the reduced diameter portion 75 of the piston rod and guided for vertical movement by the upper portion of the stem 91, the latter having a lower enlarged diameter portion 93 forming a shoulder for limiting blow-off movement of the valve 90. A coiled compression spring 94 normally holds the valve 90 seated and abuts the spider 92 about the base of the stem 91. Where the stem 91 projects to a limited extent into the lower end of the bore 89, the latter is preferably enlarged, as indicated at 95, by tapering or the like, so as to assure free passage of fluid past the stem.

In operation, the piston assembly 13 will normally be approximately centered longitudinally in the piston chamber 12 and slight fluctuations in movement of the vehicle will be accommodated by orifice flow displacement of hydraulic fluid in the piston chamber through the by-pass or displacement grooves 87 in the piston and the similar grooves 61a in the foot valve assembly. Upon compression stroke of the piston, hydraulic fluid blows-off under pressure to the upper pressure side of the piston through the passages 79 and the groove 78 and past the check valve 80. At the same time hydraulic fluid displaced by the piston rod 14 blows-off to the reservoir 18 by unseating of the check valve 72 of the foot valve assembly. On rebound, hydraulic fluid from the upper side of the piston blows-off past the check valve 90 in the piston assembly, and the displaced hydraulic fluid in the reservoir 18 returns to the lower side of the piston past the check valve 62 in the foot valve assembly.

Since, in the operation of the shock absorber, the hydraulic fluid in the reservoir 18 may tend to surge and foam, it is customary to provide a separately formed splash or surge baffle plate or ring secured to the inner wall of the reservoir tube 17 within the reservoir chamber at an intermediate point. By the present invention, however, a separately formed surge baffle element is eliminated by the provision of an annularly indented surge baffle ridge 97 (Figure 1) preferably formed at approximately the mid-point of the reservoir casing tube 17.

The internal diameter defined by the surge baffle ridge 97 is slightly greater than the cylinder 11 so as to provide a surge passage 98 therebetween for restrained flow of hydraulic fluid.

In the modification of Figure 4, a telescopic or direct acting shock absorber 100 has a cylinder tube 111 defining a piston chamber 112 within which a piston (not shown) having a piston rod 114 is operable in the same manner as hereinbefore described in connection with the piston assembly 13. At its outer end the piston rod 114 carries an attachment eye 115. A casing tube 117 of larger diameter than the cylinder tube 111 is disposed concentrically about the latter and provides a reservoir chamber 118.

A larger diameter dust shield tube 120 is secured to the piston rod 114 as by welding 123 of an integral substantially inverted cup-shaped end cap portion 122 thereof, together with the connecting eye 115. The end cap portion is preferably formed by contracting the upper end portion of the tubing from which the shield tube 120 is made, similarly as the lower end portion of the tube 17, already described.

The upper ends of the piston and reservoir chambers 112 and 118, respectively, are closed and the tubes 111 and 117 are maintained concentric by a closure member 125, which has an axial bearing bore 127 through which the piston rod 114 extends slidably. A downwardly projecting tapered boss 128 fits into the upper end of the cylinder tube 111 with the upper end of the tube being opposed by a shoulder 129 at the base of the boss 128. A lateral cylindrical flange portion 130 of the closure member 125 is received within a slightly reduced diameter portion 131 in the upper end section of the casing tube 117.

Packing 132 is maintained in fluid sealing relation about the piston rod 114 by means of an enclosure portion 133 formed as an integral one-piece contraction of the upper end portion of the tube 117, and a "floating" pressure plate 134. A contraction 135 in the integral end cap 133 provides a confining chamber for the packing 132, and a radially extending inwardly facing shoulder 138 seats against the upper end of the closure member 125. For maintaining the pressure plate 134 under packing compressing pressure, a spiral compression spring 141 is seated at its small end within the reentrant groove provided by an inner marginal downturned flange 142 on the pressure plate and at its larger end within the reentrant corner provided at the outer side of a spring seating recess 143 in the upper side of the closure member 125. Hydraulic fluid retained within the chamber defined between the closure member 125 and the packing 132 is returned to the reservoir 118 by way of a return duct 145 formed by a groove provided in the periphery and top edge of the flange portion 130 and communicating with the recess 143 and the top of the reservoir 118.

Similarly, as in the case of the contracted lower end closure 47 previously described, the upper closure end cap 133 is formed by contracting the tubing from which the casing 117 is made, the end portion of the tubing being appropriately tooled to the proper configuration. In this instance, however, the extremity of the tube is not closed as completely as discussed in connection with the bottom enclosure 47 but is maintained or trimmed to a predetermined diameter to afford an axial piston rod clearance port 150.

Where the lower end of the casing tube is contracted to provide an integral, one-piece casing and lower enclosure cap structure as shown in Figure 3, the various components of the shock absorber contained within the casing will be assembled from the upper open end of the casing tube, the upper turned-over flange of the tube retaining the concentric stack of components assembled. On the other hand, where the upper end of the casing tube is formed with an integral, one-piece closure cap structure, as shown in Figure 4, the various components of the shock absorber will be assembled from the lower end of the tube which will be open for this purpose, and a separate lower closure cap applied to provide a lower end assembly which may in finally assembled form be substantially like prior constructions. In both instances, the integral one-piece closure cap structure avoids need for a separate closure cap structure at that particular end of the assembly and thereby eliminates not only a separate part, but also the separate operation which would be necessitated in securing the parts together. Furthermore, in the case of the upper integral one-piece closure cap 133, all need for a separate gasket, such as the gasket 39 of Figures 1 and 2, to prevent leakage from the reservoir 118 is eliminated since the packing 132, which is primarily supplied for preventing leakage past the piston rod 114, serves also to prevent leakage past the integral closure cap.

Both the compression blow-off valve 72 of the foot valve assembly and the rebound blow-off disk valve 90 of the piston assembly may be formed from a non-metallic material such as hard rubber, or a suitable hard plastic. Under some circumstances this affords distinct advantage because of the resistance of such materials to heat warpage, and the like. Moreover, such materials have less resonance than metal and are therefore quieter in operation.

It will, of course, be understood that various details may be varied through a wide range without departing from the principles of this invention and it is, therefore, not the purpose to limit the patent granted hereon otherwise than necessitated by the scope of the appended claims.

I claim as my invention:

1. In combination in a direct acting shock absorber construction, a cylinder tube, a casing tube of larger diameter and greater length than the cylinder tube, a piston operable in the cylinder tube and having a piston rod projecting from one end thereof, a closure member axially bored and providing a sliding bearing for the piston rod, said closure member interfitting with the end of the cylinder tube and having a lateral portion in close proximity with the casing tube to maintain the tubes concentric, a packing gland structure, and a closure cap carried by said closure member and providing a packing gland chamber therewith about the end portion of the piston rod, the extremity of said casing tube being turned over into engagement with said closure cap to hold said cap assembled on said closure member and said closure member assembled upon the cylinder tube.

2. In combination in a direct acting shock absorber construction, a cylinder tube, a casing tube of larger diameter than the cylinder tube, a piston operable in the cylinder tube and having a piston rod projecting from one end thereof, a closure member axially bored and providing a sliding bearing for the piston rod, said closure member interfitting with the end of the cylinder tube and having a portion thereof in annularly spaced relation to the surrounding portion of the casing tube, a packing gland structure, a closure cap carried by said closure member and providing a packing gland chamber therewith about the end portion of the piston rod, the extremity of said casing tube being turned over to hold said closure member and said closure cap assembled with the cylinder tube, said closure member having a peripheral groove therein partially closed by the wall of the casing tube and the proximate portion of the closure cap, and packing compressed into said groove and the space between the closure member and the casing tube by said proximate portion of said closure cap to prevent leakage of fluid from the interior of the shock absorber.

3. In combination in a direct acting shock absorber of the character described, a cylinder tube, a casing tube, a piston rod, a closure member for the cylinder tube affording an axial bearing aperture for the piston rod, the end portion of the casing tube being contracted to secure the closure member in assembly and also having a dome-like portion extending outwardly beyond the closure member and to a diameter approximately the same as and aligned with said bearing aperture for passage of a piston rod, said dome-like portion defining with the end of the closure member a packing chamber for packing means to maintain a sealed relation with the piston rod.

4. In combination in a direct acting shock absorber, a cylinder tube, a closure member for the cylinder tube, a piston rod, said closure member having an axial bore providing a bearing for said piston rod, a casing tube concentrically surrounding the cylinder tube and having the end portion thereof contracted to provide a seat engaging and holding said closure member in assembly with the cylinder tube and also having a further contracted portion axially beyond the closure member and providing a chamber therewith, said further contracted portion having a passage for the piston rod, a packing ring seated in said further contracted portion for effecting a seal about the piston rod, a pressure plate, and a spring seated on said closure member and acting against said pressure plate to compress the packing ring into sealing relation.

5. In a direct acting shock absorber construction, a cylinder tube, a casing tube of larger diameter enclosing said cylinder tube in concentric spaced relation and defining a reservoir chamber therebetween, an intermediate portion of said casing tube being contracted to a diameter approaching the diameter of the cylinder tube but somewhat greater and defining a surge ridge.

6. In a casing tube for a direct acting shock absorber, a cylindrical tube body, one end of said tube being contracted to provide a generally cup-shaped closure, an intermediate portion of said body being sharply contracted inwardly and providing an annular surge ridge.

7. In combination in a direct acting shock absorber, a tubular cylinder, a piston reciprocable in said cylinder, a piston rod projecting beyond one end of the said cylinder, a reservoir tube concentrically encircling the cylinder, an end closure member having a sliding bearing aperture for the piston rod and cooperating with the end of the cylinder from which the piston rod extends to maintain the cylinder tube closed and concentric with the piston rod, an end cap of inverted cup-shape seated on said closure member and marginally connected to the reservoir tube and having a piston rod aperture through which the piston rod extends, said end cap and said closure member cooperating to maintain said reservoir tube concentric with the cylinder and defining a packing chamber, an annular groove in the closure member opening upwardly in said chamber, a spiral compression spring seated in said groove at one end, and packing urged by the other end of said spring into the end cap and against said piston rod, said closure member having drain passage therefrom into the space between said cylinder and said reservoir tube.

8. In combination in a direct acting shock absorber, a tubular cylinder, a piston reciprocable in said cylinder, a piston rod projecting beyond one end of the said cylinder, a reservoir tube concentrically encircling the cylinder, an end closure member cooperating with the end of the cylinder from which the piston rod extends and having a sliding bearing aperture for the piston rod, an end cap seated on said closure member and having a piston rod aperture through which the piston rod extends, said end cap and said closure member defining a packing chamber, an annular groove in the closure member opening upwardly in said chamber, a spiral compression spring seated in said groove at one end, and packing urged by the other end of said spring into the end cap and against said piston rod, said closure member having drain passage therefrom into the space between said cylinder and said reservoir tube, said groove having a sump depression depressed below the normal bottom of the groove communicating with said drain passage.

9. In combination in a direct acting shock absorbed, a tubular cylinder, a piston reciprocable in said cylinder, a piston rod projecting beyond one end of the said cylinder, a reservoir tube concentrically encircling the cylinder, an end closure member cooperating with the end of the cylinder from which the piston rod extends and having a sliding bearing aperture for the piston rod, an end cap seated on said closure member and having a piston rod aperture through which the piston rod extends, said end cap and said closure member defining a packing chamber, an annular groove in the closure member opening upwardly in said chamber, a spiral compression spring seated in said groove at one end, and packing urged by the other end of said spring into the end cap and against said piston rod, said closure member having drain passage therefrom into the space between said cylinder and said reservoir tube, said end cap comprising an integral one piece end portion of said reservoir tube and said passage comprising a groove in the periphery of said closure member, the outer side of the groove being closed by said end cap.

10. In combination in a direct acting shock absorber, a tubular cylinder, a piston reciprocable in said cylinder, a piston rod projecting beyond one end of the said cylinder, a reservoir tube concentrically encircling the cylinder, an end closure member cooperating with the end of the cylinder from which the piston rod extends and having a sliding bearing aperture for the piston rod, an end cap seated on said closure member and having a piston rod aperture through which the piston rod extends, said end cap and said closure member defining a packing chamber, an annular groove in the closure member opening upwardly in said chamber, a spiral compression spring seated in said groove at one end, and packing urged by the other end of said spring into the end cap and against said piston rod, said closure member having drain passage therefrom into the space between said cylinder and said reservoir tube, said end cap and said reservoir tube comprising separate elements, said end cap and said closure member having groove and flange interconnection and the adjacent end portion of the reservoir tube retaining the end cap and closure member in assembled relation.

11. In combination in a direct acting shock absorber construction, a cylinder tube, a casing tube of larger diameter enclosing said cylinder tube in concentric spaced relation and defining a reservoir chamber therebetween, means at the opposite ends of the tube assembly maintaining the tubes in said concentric spaced relation and in relative axial assembly, piston means operable within the cylinder tube and having a piston rod extending from one end of the assembly, the opposite end of the assembly having valve controlled passage from the cylinder tube into said reservoir chamber for displacement of fluid between the cylinder tube and the reservoir chamber, an intermediate portion of said casing tube being contracted to a diameter close to the external diameter of the cylinder tube and defining an inwardly directed ridge the peak of which is adjacent to the outer diameter of the cylinder tube.

JOHN NOBLE STRAUSS.

References Cited in the file of this patent

UNITED STATES PATENTS

| Number | Name | Date |
| --- | --- | --- |
| 1,883,488 | Beecher | Oct. 18, 1932 |
| 1,983,064 | Bates | Dec. 4, 1934 |
| 1,991,043 | Bates | Feb. 12, 1935 |
| 2,060,590 | Padgett | Nov. 10, 1936 |
| 2,087,451 | Rossman et al. | July 20, 1937 |
| 2,103,839 | Bardell | Dec. 28, 1937 |
| 2,182,034 | Oberstadt | Dec. 5, 1939 |
| 2,332,161 | McIntyre et al. | Oct. 19, 1943 |
| 2,406,059 | Burch | Aug. 20, 1946 |
| 2,408,596 | Bednar et al. | Oct. 1, 1946 |
| 2,421,629 | Langos | June 3, 1947 |
| 2,435,160 | Rossman | Jan. 27, 1948 |
| 2,481,088 | Cuskie | Sept. 6, 1949 |
| 2,498,802 | Funkhouser | Feb. 28, 1950 |
| 2,507,266 | Patriquin | May 9, 1950 |
| 2,551,749 | Lewton | May 8, 1951 |
| 2,604,193 | Wyeth | July 22, 1952 |
| 2,607,443 | Mayo et al. | Aug. 19, 1952 |